(12) United States Patent
Hennebelle

(10) Patent No.: US 6,789,419 B2
(45) Date of Patent: Sep. 14, 2004

(54) PLASTICS LIQUID METER BODY

(75) Inventor: Barbara Hennebelle, La Couture (FR)

(73) Assignee: Actaris S.A.S., Montrouge (FR)

( * ) Notice: Subject to any disclaimer, the term of this patent is extended or adjusted under 35 U.S.C. 154(b) by 0 days.

(21) Appl. No.: 10/221,367

(22) PCT Filed: Mar. 13, 2001

(86) PCT No.: PCT/FR01/00733
§ 371 (c)(1),
(2), (4) Date: Jan. 13, 2003

(87) PCT Pub. No.: WO01/69187
PCT Pub. Date: Sep. 20, 2001

(65) Prior Publication Data
US 2003/0140693 A1 Jul. 31, 2003

(30) Foreign Application Priority Data
Mar. 15, 2000 (FR) .......................................... 00 03349

(51) Int. Cl.⁷ .............................................. G01F 15/14
(52) U.S. Cl. ..................................................... 73/273
(58) Field of Search ............................... 73/272 R, 273,
73/204.22, 52; 220/661, 664, 675, 676,
628; 137/454.2, 454.6

(56) References Cited

U.S. PATENT DOCUMENTS 4,391,139 A     7/1983 Sutherland et al.
5,341,686 A  *  8/1994 Chai ........................ 73/861.33
5,840,128 A  * 11/1998 Imig .............................. 134/8

FOREIGN PATENT DOCUMENTS

DE        24 00 408        7/1975
DE        198 38 320       2/2000

* cited by examiner

Primary Examiner—Harshad Patel
(74) Attorney, Agent, or Firm—Straub & Pokotylo; Michael P. Straub

(57) ABSTRACT

A liquid meter body including a plastic material bucket 1 which includes a lower portion 3 delimited by a bottom 9 end by a lower side wall 10 and a cylindrical upper portion 4 delimited by an upper side wall. The upper side wall joins onto the lower side wall at a shoulder 5. The lower portion 3 defines a housing 2 for a measuring chamber. The meter body further comprises entry and exit tubes 6, 7, the tubes having an external thread, the interior of the tubes opening into the housing 2 of the measuring chamber via a bore formed in the lower side wall 10 and respectively forming an injector 11 and an ejector 12. The meter body has an elliptical bottom 9. The bores forming the injector 11 and the ejector 12 are elliptical.

5 Claims, 2 Drawing Sheets

PLASTICS LIQUID METER BODY

BACKGROUND OF THE INVENTION

Field of the Invention

The present invention relates to a plastics material liquid meter body, in particular a plastics material water meter body.

To be more precise, the present invention relates to a liquid meter body suitable for either of the two main types of fluid meter familiar to the person skilled in the art, namely volumetric meters, such as oscillating piston, diaphragm or nutating disk liquid meters, and velocity meters, such as turbine liquid meters (single-jet or multiple-jet) or screw liquid meters.

In the field of water meters, the meter body has for many years been made from a metal alloy such as brass. This material has good resistance to aging, and in particular the metrological performance of the meter and its water tightness are maintained over time.

For many years water meter manufacturers have been attempting to replace brass with plastics materials. A plastics material water meter body has many advantages, such as the possibility of modifying the design of the meter body to integrate new functions, a much wider range of colors than with brass, a significant saving in weight, a saving in manufacturing cost, a reduction in the noise generated by the meter in operation, and finally elimination of problems associated with the pollution of drinking water in contact with brass. However, there remains a major problem with plastics material water meter bodies in that they do not offer good mechanical performance, which leads in particular to problems with withstanding the high fluid pressure and with aging. For example, cracks have been observed to appear, leading to leaks, after a much shorter time period than the normal service life expected of a water meter.

BRIEF SUMMARY OF THE INVENTION

An objective of the present invention is to alleviate the drawbacks previously cited by proposing a liquid meter body having improved mechanical performance. The liquid meter body in accordance with the invention includes a plastic material bucket which includes a lower portion delimited by a bottom and by a lower side wall and a cylindrical upper portion delimited by an upper side wall, said upper side wall joining onto the lower side wall at a shoulder, the lower portion defining a measuring chamber, said meter body further comprises entry and exit tubes having an external screwthread, said tubes each opening into the measuring chamber via a bore formed in the lower side wall and respectively forming an injector and an ejector, said meter body is characterized in that the bottom is elliptical.

The above type of water meter body significantly reduces the concentration of stresses. This prevents cracks appearing over time in the body of the meter, thereby preventing leaks.

In one embodiment at least one of the bores forming the injector and the ejector is elliptical.

In another embodiment each tube has a cylindrical exterior shape and at least one of the tubes has an elliptical interior shape.

The above type of tube shifts the concentrations of stresses outside the fragile areas of the part, in particular outside the weld lines between the tubes and the lower part of the bucket. Once again, the risk of cracks appearing at the level of the junction between the tubes and the lower portion of the bucket is considerably reduced.

A water meter equipped with a plastics material meter body having the above features has a much higher critical mechanical strength threshold than prior art plastics material meter bodies and reduces the level of mechanical stress for a given liquid pressure. Moreover, the above kind of meter body is found to have a service life much greater than prior art plastics material meter bodies. It must also be noted that the particular shape of the meter body, the bore and the tubes has no significant influence on the flow of the fluid in the meter body and does not influence the quality of flowrate measurement.

Other advantages and features of the invention will emerge from a reading of the following description, which is given by way of example and with reference to the accompanying drawings.

BRIEF DESCRIPTION OF THE SEVERAL VIEWS OF THE DRAWINGS(S)

DETAILED DESCRIPTION OF THE INVENTION

The following description relates to a volumetric meter body. However, the person skilled in the art will easily be able to adapt this meter body to the other types of meters previously mentioned.

Figure 1:
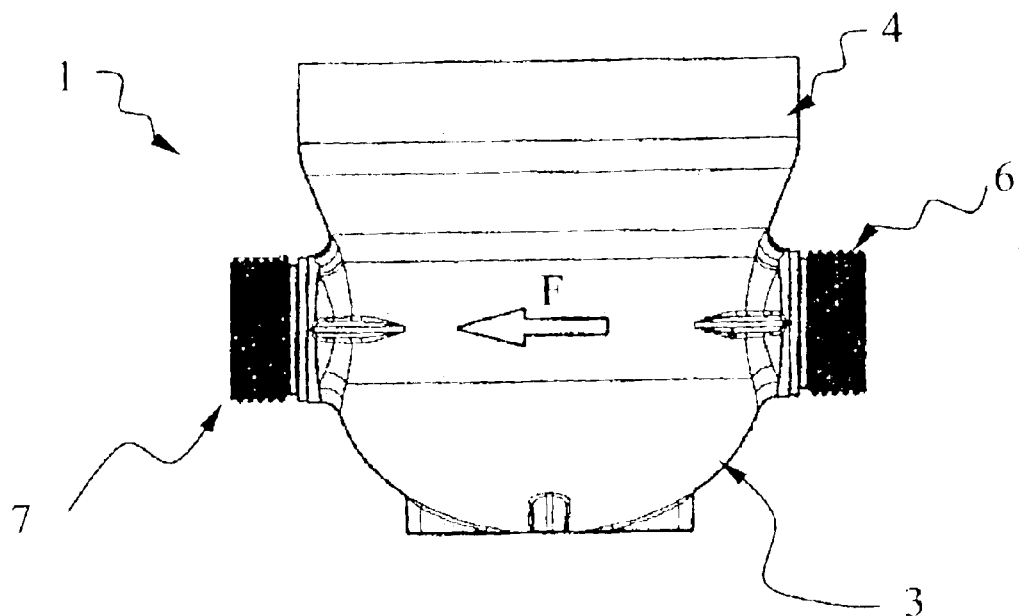
FIG. 1 is a side view of a volumetric meter body according to the invention.
Figure 2:
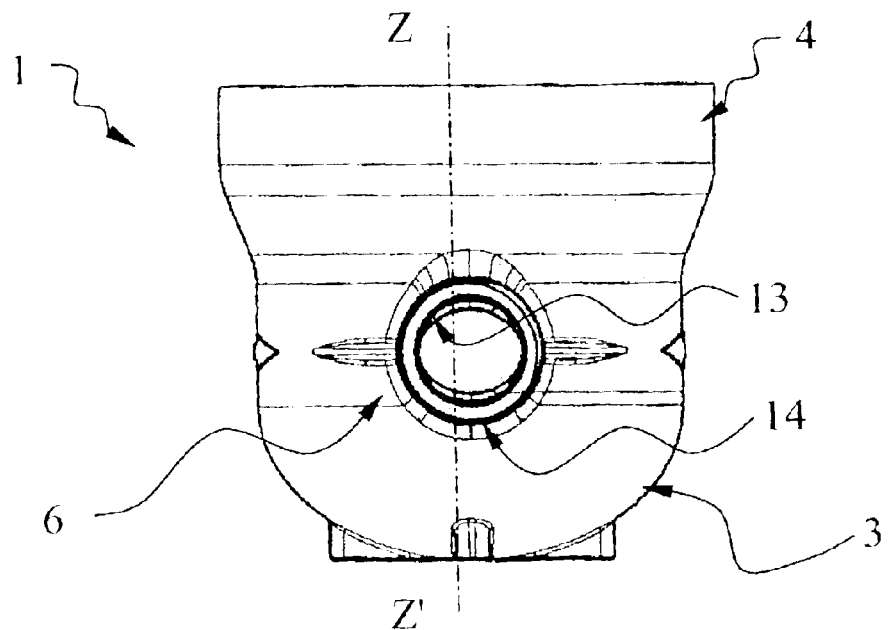
FIG. 2 is a front view of a volumetric meter body according to the invention.
Figure 3:
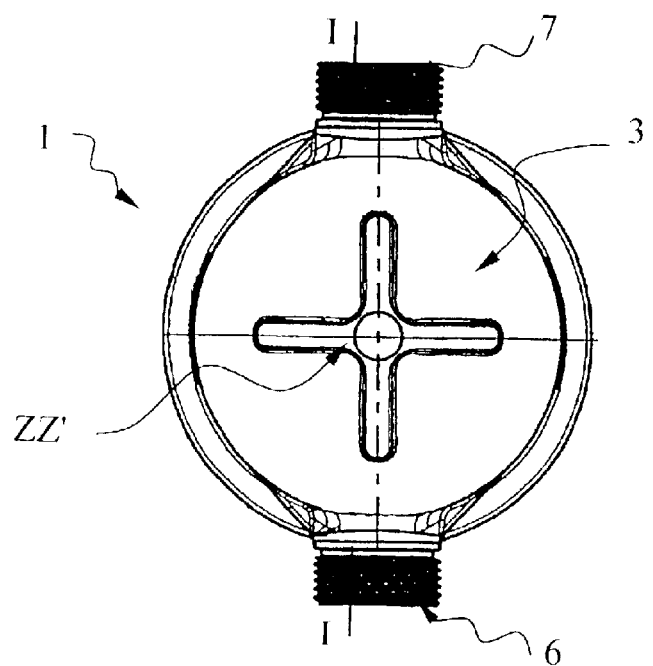
FIG. 3 is a bottom view of the meter body from FIG. 1.
Figure 4:
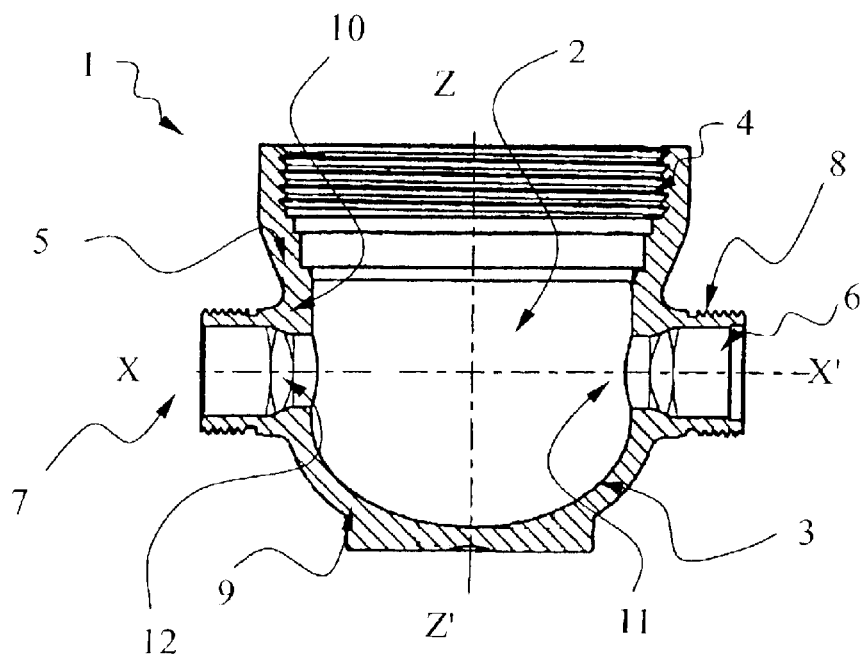
FIG. 4 is a view of the meter body in vertical section taken along the line I-1 in FIG. 3.

FIGS. 1 to 4 show the whole of the meter body according to the invention. The body includes a bucket 1 which is rotationally symmetrical about an axis ZZ'. The bucket is in one piece and comprises a lower portion 3 and an upper portion 4. The lower portion 3, which defines a housing 2 into which a measuring chamber is inserted, is delimited by an elliptical bottom 9, as can be seen in the FIG. 4 sectional view, and a cylindrical lower side wall 10, as can be seen in the FIG. 3 bottom view. The upper portion 4 is delimited by an upper side wall, which is also cylindrical, as can be seen in the FIG. 3 bottom view. The side walls of the two portions join at a shoulder 5.

The meter body includes substantially cylindrical entry and exit tubes 6, 7 with an external screwthread 8. Each tube opens into the measuring chamber 2 via a bore formed in the lower side wall 10 of the measuring chamber 2 forming an injector 11 and an ejector 12, respectively. The injector and the ejector have a common axis XX' perpendicular to the axis ZZ'.

The lower portion 3 delimits the housing of the measuring chamber of the meter in which a turbine, a screw or an oscillating piston, for example (not shown in the figures) is mounted, depending on the meter type.

The upper portion 4 is adapted to receive a totalizator/display assembly (not shown) whose function is to convert the quality of liquid that has flowed through the meter in the flow direction F into a number that can be read off or communicated to an external user and corresponds to the measured volume of liquid.

In a first embodiment, the bore forming the injector 11 and the ejector 12 is elliptical.

In a second embodiment, the entry and exit tubes 6, 7 have an elliptical interior shape 13 and a substantially cylindrical external shape 14.

Accordingly, because of its cylindrical external shape and its screwthread, the tube enables the meter body to be fitted and screwed perfectly to cylindrical pipes.

The elliptical shape of the bore and/or the interior of the tube displaces mechanical stresses outside fragile areas of the meter body, in particular outside weld lines.

The elliptical shape chosen for the bottom of the bucket, the bore and the interior of the tubes improves the critical mechanical strength threshold of the meter body as a whole, which can resist much higher fluid pressures than prior art plastics material meter bodies.

What is claimed is:

1. A liquid meter body comprising:

a plastic material bucket (1) which includes a lower portion (3) delimited by a bottom (9) having a bottom interior and by a lower side wall (10) and a cylindrical upper portion (4) delimited by an upper side wall, said upper side wall extending along a first axis to join the lower side wall at a shoulder (5), the lower portion (3) defining a housing (2) for a measuring chamber, said meter body further comprises entry and exit tubes (6, 7) having an external screwthread, said tubes each opening into the housing (2) via a bore formed in the lower side wall (10) and respectively forming an injector (11) and an ejector (12), the bottom interior of said meter body being non-circular and elliptical in at least one plane parallel to said first axis.

2. A liquid meter body according to claim 1, wherein at least one of the bores forming the injector (11) and the ejector (12) is non-circular and elliptical.

3. A liquid meter body according to either preceding claim, wherein each tube (6, 7) has a cylindrical exterior shape and wherein at least one of the tubes (6, 7) has a non-circular elliptical interior shape.

4. A liquid meter body according to claim 1, wherein said non-circular elliptical bottom corresponds to approximately half of an ellipse.

5. A liquid meter body according to claim 1, wherein said entry tube has a cylindrical exterior shape and an oval elliptical interior cross section in a direction perpendicular to an axis extending from a first opening in a first end of said entry tube to a second opening in a second end of said entry tube.

* * * * *